United States Patent [19]

Meeks et al.

[11] Patent Number: 4,532,040
[45] Date of Patent: Jul. 30, 1985

[54] WATER TREATMENT DEVICE

[76] Inventors: Jasper L. Meeks, Rte. 2 Box 35-A, Edinburg, Tex. 78539; John D. Corney, P.O. Box 2231, McAllen, Tex. 78501

[21] Appl. No.: 605,750

[22] Filed: May 10, 1984

Related U.S. Application Data

[63] Continuation-in-part of Ser. No. 332,615, Dec. 21, 1981, abandoned.

[51] Int. Cl.³ .............................................. B01B 35/06
[52] U.S. Cl. ................................................... 210/222
[58] Field of Search ............................... 210/222, 223

[56] References Cited

U.S. PATENT DOCUMENTS

| 438,579 | 10/1890 | Faunce et al. | 210/222 |
| 2,652,925 | 9/1953 | Vermeiren | 210/222 |
| 3,680,705 | 8/1972 | Happ | 210/222 |
| 3,923,660 | 12/1975 | Kottmeier | 210/222 |
| 4,455,229 | 6/1984 | Sandeason et al. | 210/222 |

Primary Examiner—John Adee
Attorney, Agent, or Firm—Kanz, Scherback & Timmons

[57] ABSTRACT

A fluid ionization device having a casing and outer ring of magnets secured equally about the inner circumference of the magnet and an inner ring of magnets secured equally from the outer ring so as to form an annulus between the inner and outer rings which permits constant flow of fluid therebetween at a constant rate to maintain equal ionization of the fluid.

14 Claims, 4 Drawing Figures

WATER TREATMENT DEVICE

BACKGROUND

This is a continuation-in-part of application Ser. No. 06/332,615, filed Dec. 21, 1981, now abandoned.

When water is used in boilers and other heating systems, it has been found that as it is heated a hard scale forms on the walls of the tubes and boiler which is difficult to remove and decreases the efficiency of the heat transfer to the water. The system must be shut down and periodically treated with harsh acids in order to remove these, which is very corrosive to the system itself.

It has been discovered that if the water is passed through a magnetic field prior to its entry into the heating system that the water becomes ionized such that the scale is not formed on the boiler or tubes carrying the water.

Many devices have been designed in an attempt to ionize the water. Because of the designs, the water is not fully and equally ionized, thereby decreasing the efficiency of the devices. We have developed a fluid ionization device for treatment of fluids and even ionization of the fluid passing through the device.

SUMMARY OF INVENTION

The fluid treatment apparatus generally comprises concentric rings contained in a tubular casing with an inner concentration of rings supported therein such that an annular or circular opening space is formed about or between the rings. The magnets are positioned in the outer and inner rings such that the water flows constantly in the annulus at the same velocity to permit even ionization of all water that passes through. There are no dead spots where water can pass without passing between the magnets thereby assuring complete ionization of the fluid.

A primary object of the water invention is to ionize the fluid as it flows through the device at a constant velocity at all points.

A further object of the invention is to permit the fluid to flow through the device with a minimum constriction while insuring that all the fluid is treated for maximum ionization.

Other and further objects of the invention will become more apparent while studying the detailed description and drawings annexed hereto.

DESCRIPTION OF THE DRAWINGS

Drawings of a preferred embodiment of the invention are annexed hereto so that the invention may be better and more fully understood in which.

Numeral references are used to designate like parts throughout the various figures of the drawings.

DESCRIPTION OF PREFERRED EMBODIMENT

Figure 1:
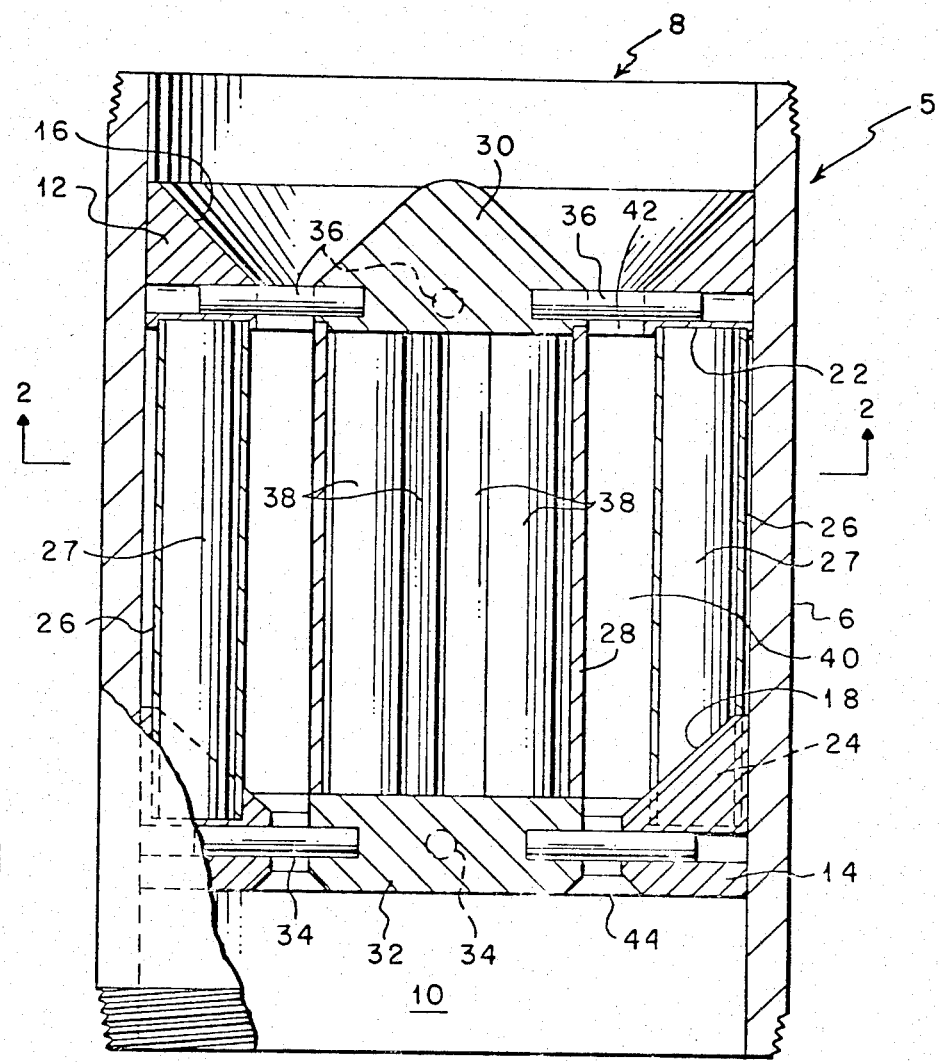
FIG. 1 is an elevational view of the water treatment device with parts broken away to more clearly illustrate the details of construction.
Figure 2:
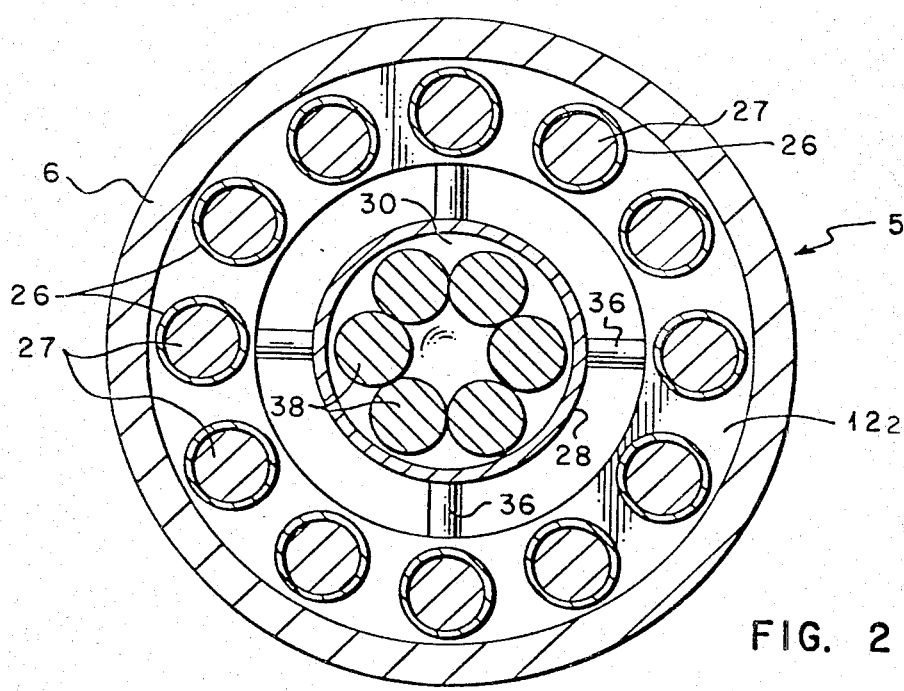
FIG. 2 is a cross-sectional view taken along line 2—2 of FIG. 1.

Referring to FIGS. 1 and 2 of the drawings, the water treatment device is generally designated by the numeral 5. The device 5 generally comprises a tubular casing 6 formed from a suitable material such as stainless steel. The ends of the casing are adapted to mate with standard suitable coupling for placing in a suitable flow conducting tube. Fluid will enter the inlet end 8 and exit the exit end 10.

Upper and lower support rings 12 are secured in casing 6 and have beveled inner edges 16 and 18 to increase the flow of fluid therethrough. A plurality of spaced counter bores 22 and 24 are formed on complimentary sides of rings. These protective tubings 26 incase suitable magnets 27 for forming the outer magnetic rings.

An inner casing 28 is suitably supported by an upper conically shaped nosecone 30 and a bottom cap 32. Bottom cap 32 is suitably supported by spaced pins 34 which are journaled into bottom ring 14. The upper nosecone 30 is likewise suitably supported by pins 36 journaled in openings formed in the upper ring 12. A plurality of the elongated round magnets 38 are positioned within the inner casing 28. A hollow annulus 40 is formed between the inner casing 28 and the outer circumference of magnetic casing 26 through which the fluid to be treated is passing.

Operation of the hereinfore described device is as follows: the fluid to be treated may be of several types such as water, cooking oils and other heated fluids normally used in fluid operation. The magnetic field necessary to create ionnization is some $10^2$ to $10^3$ oersteds in boiling situations. The fluid must pass between the poles of the magnet for ionization to occur. In experiments it has been found that magnets comprised of cobalt, nickel and aluminum are preferred in that they give the required magnetic field.

By directing the fluid over a conical shaped cone 30 to the inlet the water is funneled by the bevel shape 16 of the upper rings 12 and the bevel shape of the cone 30 into the annulus 40 between the magnetic fields. As the passageway 42 into the annulus 40 is equal in all areas between the magnets, the rate of flow into the annulus 40 will be equal. As the exit is equal in all dimensions the exit flow rate is likewise equal. It should be noted from the drawing that there are no areas through which the fluid may flow without flowing between the magnets. Further, because of the unique geometric design of the magnets and their positioning withing the device an equal magnetic field is formed between them which is equal in all areas of the space. The device is constructed such that eddys are minimized in the flow through the device. Likewise the Venturi effect is also minimized as fluid flows therethrough. Thus maximum ionization of the fluid as it flows through the device is acheived without undue restriction and by maintaining a constant flow rate through the device as previously described.

The length of said device is dependent of the flow rate of the fluid passing therethrough.

Figure 3:
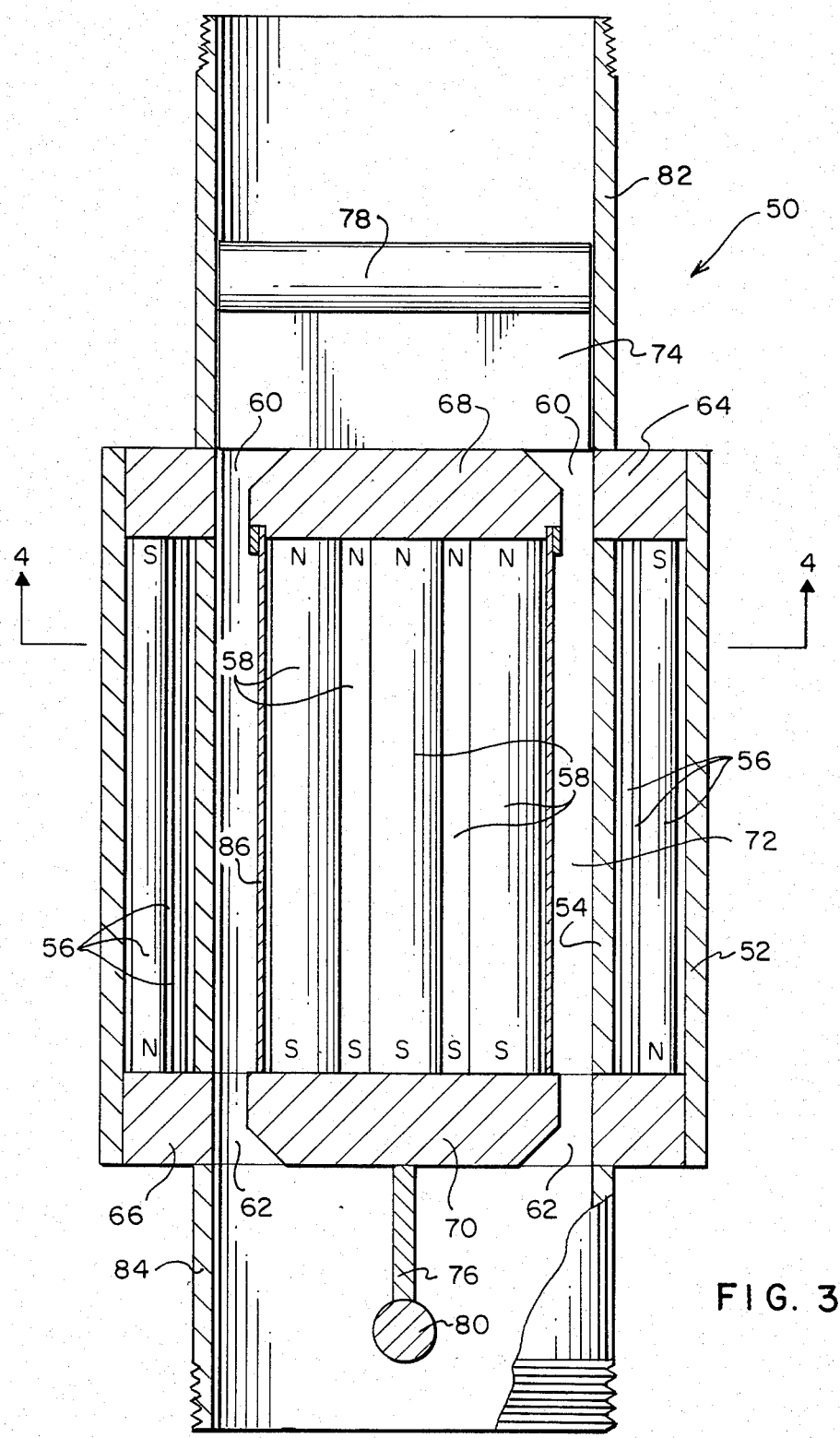
FIG. 3 is an elevational view similar to that of FIG. 1 of another embodiment of a fluid treatment apparatus according to the present invention.
Figure 4:
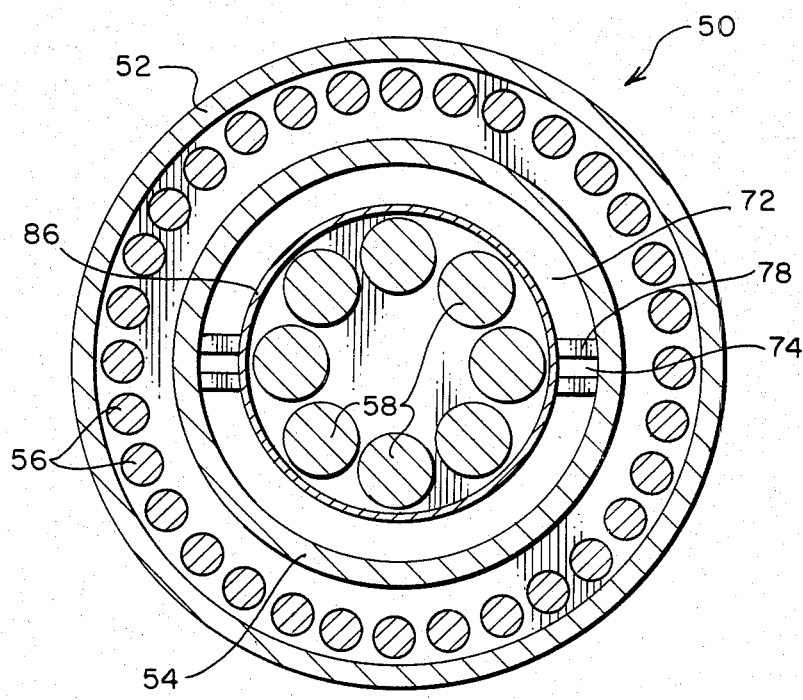
FIG. 4 is a cross-sectional view taken along line 4—4 of FIG. 3.

Referring now to FIG. 3 and FIG. 4, an alternative embodiment of a fluid treatment apparatus according to the present invention is referred to generally by reference numeral 50. Fluid treatment apparatus 50 includes a casing 52, a pipe 54 surrounded by the casing, an outer ring of magnets 56 arranged about the inner circumference of the casing and the outer circumference of the pipe, and a purality of magnets 58 arranged on the interior of and spaced from pipe 54. Pipe 54 forms an inlet 60 and an outlet 62. An inlet support ring 64 connects the inlet of pipe 54 to casing 52, and an outlet support ring 66 connects outlet 62 of pipe 54 to casing 52. Outer ring of magnets 56 is secured by inlet and outlet support rings 64 and 66. A nosecone 68 is secured on the inlet end of the purality of interior magnets 58 opposite inlet support ring 64, and an outlet cap 70 is secured on the outlet end of plurality of interior magnets 58 opposite outlet support ring 66. An annular space 72 is formed between pipe 54 and plurality of interior magnets 58, and the elements comprising the fluid treatment apparatus are designed, sized and positioned for providing substantially constant velocity of a fluid through the annular space. In the particular embodiment illustrated, nosecone 68 and outlet cap 70 are of similar shape so that fluid can flow through annular space 72 in either direction in substantially the same manner. As illustrated, nosecone 68 and outlet cap 70 have beveled edges 69 and 71 respectively to aid fluid flow through the apparatus. Rounded edges or a nosecone shape similar to nosecone 30 of FIG. 1 could also be used with similar results. Means for securing nosecone 68, outlet cap 70 and plurality of interior magnets 58 with respect to pipe 54 includes an inlet plate 74 which has one edge abutting nosecone 68 and outlet plate 76 which has one edge abutting outlet cap 70. Inlet plate 74 and outlet plate 76 are in turn affixed to inlet bar 78 and outlet bar 80 respectively. Inlet bar 78 and outlet bar 80 are affixed to inlet pipe extension 82 and outlet pipe extension 84 respectively through welding or other suitable attachment means. In the particular embodiment illustrated, outlet plate 76 and outlet bar 80 are turned at a 90 degree angle with respect to inlet plate 74 and inlet bar 78. Inlet pipe extension 82 and outlet pipe extension 84 are affixed to inlet support ring 64 and outlet support ring 66 respectively, again by welding or other suitable affixing means. In the embodiment illustrated, a center tube 86 is within pipe 54 securely fitted between nosecone 68 and outlet cap 70. Plurality of interior magnets 58 is positioned within center tube 86, and the nosecone and outlet cap cover the ends of the center tube. Annular space 72 is thus formed between center tube 86 and pipe 54. Pipe 54, pipe extensions 82 and 84, plates 74 and 76, bars 78 and 80 and casing 52 are formed from a suitable non-magnetic material such as stainless steel in the present embodiment. Nosecone 68, outlet cap 70, inlet support ring 64 and outlet support ring 66 are megnetizable. In such an arrangement, outer ring of magnets 56 is of one polarity and plurality of interior magnets 58 is of the opposite polarity. Inlet support ring 64 is thus of the opposite magnetic polarity from nosecone 68 and outlet support ring 66 is of the opposite magnetic polarity from outlet cap 70. Magnetic lines of force are thus focused between nosecone 68 and inlet support ring 64 on the inlet end and between outlet cap 70 and outlet support ring 66 on the outlet end.

In general, the higher the field strength at inlet 60 and outlet 62, the more surface tension is reduced in the fluid and the more scale deposits are removed while at the same time the PH of water in recirculating systems is raised. Different field strengths affect various elements in different ways. The performance of chlorine used to oxidize matter and disinfect water in swimming pools is adversely affected by a high field strength, but its performance is enhanced by a lower field provided the exposure time in the field is of sufficient duration. The exposure time is relative to the velocity or flow rate of the fluid through the apparatus. For a fluid treatment apparatus according to the present invention to treat water in a swimming pool, a field strength of 700-1200 Gauss is preferred, whereas 1000-2000 Gauss is perferred for water in a cooling tower or 1,500-3000 Gauss for cooling with seawater. A preferred range is 1000 to 4000 Gauss for boilers. The field strength and exposure time at a given flow rate is affected by the amount and the shape of beveled edges 69 and 71. The longitudinal thicknesses of nosecone 68 and outlet cap 70 and rings 64 and 66 also affect the exposure time and field strength. The amount and type of magnetic material used also directly affects the field strength. The nosecones and rings play an important part in focusing the lines of magnetic force in density and direction.

In corrosive fluids applications such as acids, hydrogen sulfide in crude oil and seawater, a variety of corrosion resistant coatings can be used. Where the fluid is abrasive as in drilling fluids, the nosecone can be rounded rather a straight bevel. In extreme cases a non-magnetic abrasive resistant bull nose is fitted on the front of the nosecone.

Where extensive treatment of a fluid is needed, units may be connected to each other in series so that the fluid passes through each unit. This is a multiple alternating pole system where the magnetic poles alternate N-S-N-S-N-S for as many poles as are needed for the application. This principle could also be used to develop a single alternating pole unit.

For larger apparatus according to the present invention, concentric rings of magnets can be used. The number of rings depends on the diameter of the unit and the flow rate and field strength required for the application. The magnetic polarity of a ring is opposite to the ring or rings next to it. Thus, if the center nosecone is a north seeking pole, then the ring immediately surrounding the nosecone must have a south pole, and the ring outside of that will be north again.

In yet another alternative embodiment, outer ring of magnets 56 is omitted and casing 52 is formed of a magnetizable material connecting magnetizable inlet support ring 64 to magnetizable outlet support ring 66, providing a magnetizable path, and focusing the magnetic lines of force in a manner similar to that already described.

It should be readily apparent from the foregoing that the objects hereinbefore discussed are met by the device hereinbefore described.

It should be more readily apparent that other and further embodiments of the device may be devised without parting from the basic concept herein.

We claim:

1. A fluid treatment apparatus having an annular space for ionizing the fluid comprising elements designed, sized and positioned for providing constant velocity of fluid through the annular space, including:
   (a) a casing;
   (b) an outer ring of magnets arranged about the inner circumference of the casing in space relationship;
   (c) an inner ring of magnets arranged on the interior of the casing and spaced from the outer ring so as to form the annular space between the outer and inner rings of magnets;
   (d) means to support said inner ring of magnets such that the annular space is an equal distance in all areas to permit flow of fluid therethrough at equal rates;

(e) a nosecone on the inlet end of the casing over the inner ring of magnets to facilitate movement of fluid into the annular passage between the inner and outer rings of magnets; and (f) a support ring secured over the outer ring of magnets to facilitate flow into the annular passage wherein the fluid must pass between the nosecone and the support ring.

2. The combination called for in claim 1 wherein said magnets are arranged and spaced in elongated tubes in side by side relationship to form a continuous ring about the outer ring of magnets; and a tube secured about the inner ring of magnets with said magnets contained in said single tube.

3. A fluid ionization device having an annulus comprising elements designed, sized and positioned for providing constant velocity of said fluid through the annulus:

(a) a casing having an inlet and outlet adapted to be coupled with a pipe;

(b) an inlet support ring secured adjacent to inlet of said casing;

(c) an outlet support ring secured adjacent to outlet of said casing;

(d) a plurality of tubes secured between the inlet and outlet support rings and spaced in relationship along the inner circumference of said casing;

(e) a plurality of magnets having a magnetic field strength of between $10^2$ and $10^3$ oersteds in said tubes;

(f) a single tube;

(g) a nosecone formed on said single tube adjacent to the inlet end of said casing wherein the fluid must pass between the nosecone and the inlet support ring;

(h) an outlet cap secured on the opposite end of said tube wherein the fluid must pass between the outlet cap and the outlet support ring;

(i) means securing said tube parallel to said outer ring and annular passage between the outer ring of tubes and the single inner tube; and (j) a plurality of equally spaced magnets positioned within the center tube having a magnetic field strength of between $10^2$ to $10^3$ oersteds such that a magnetic field is formed between the magnets and in the annulus formed therebetween such that fluid passing therebetween flows at a constant rate and is equally ionized between the magnets.

4. A fluid ionization device according to claim 3 wherein the inlet support ring forms a beveled edge facing the inlet of the casing; and the outlet support ring forms a beveled edge facing the outlet.

5. A fluid treatment apparatus according to claim 1 wherein the nosecone and the support ring are beveled to facilitate flow between the nosecone and the support ring.

6. A fluid treatment apparatus according to claim 1 further comprising:
a pipe within the casing wherein the outer ring of magnets is arranged about the outer circumference of the pipe and the support ring is also secured over the inlet end of the pipe.

7. A fluid treatment apparatus according to claim 6 wherein the nosecone and the support ring are magnetizable, and wherein the outer ring of magnets are of one polarity and the inner ring of magnets are of the opposite polarity.

8. A fluid treatment apparatus according to claim 1 wherein the nosecone and the support ring are magnetizable, and wherein the outer ring of magnets are of one polarity and the inner ring of magnets are of the opposite polarity.

9. A fluid treatment apparatus having an annular space for ionizing the fluid comprising elements designed, sized and positioned for providing substantially constant velocity of said fluid through said annular space, comprising in combination:

(a) a casing;

(b) a pipe surrounded by the casing, and having an inlet and an outlet for the fluid;

(c) an outer ring of magnets arranged about the inner circumference of the casing and the outer circumference of the pipe;

(d) a plurality of magnets arranged on the interior of and spaced from the pipe so as to form the annular space between the pipe and the plurality of interior magnets;

(e) an inlet support ring connecting the inlet of the pipe to the casing;

(f) an outlet support ring connecting the outlet of the pipe to the casing, wherein the outer ring of magnets is secured by inlet and outlet support rings;

(g) a nosecone secured on the inlet end of the plurality of interior magnets substantially opposite the inlet support ring;

(h) an outlet cap secured on the outlet end of the plurality of interior magnets substantially opposite the outlet support ring; and (i) means for securing the nosecone, the outlet cap and the plurality of interior magnets with respect to the pipe.

10. A fluid treatment apparatus according to claim 9 wherein the nosecone, the outlet cap, the inlet support ring and the outlet support ring are magnetizable and wherein the outer ring of magnets is of one polarity and the plurality of interior magnets is of the opposite polarity.

11. A fluid treatment apparatus according to claim 10 further comprising a center tube within the pipe wherein the plurality of interior magnets is positioned within the center tube, and the nosecone and outlet cap cover the ends of the center tube, and the annular space is formed between the center tube and the pipe.

12. A fluid treatment appartus according to claim 9 further comprising a center tube within the pipe wherein the plurality of interior magnets is positioned within the center tube, and the nosecone and outlet cap cover the ends of the center tube, and the annular space is formed between the center tube and the pipe.

13. A fluid treatment apparatus having an annular space for ionizing the fluid comprising elements designed, sized and positioned for providing substantially constant velocity of said fluid through said annular space, comprising in combination;

(a) a magnetizable casing;

(b) a pipe surrounded by the casing, and having an inlet and an outlet for the fluid;

(c) a plurality of magnets arranged on the interior of and spaced from the pipe so as to form the annular space between the pipe and the plurality of interior magnets;

(d) a magnetizable inlet support ring connecting the inlet of the pipe to the casing;

(e) a magnetizable outlet support ring connecting the outlet of the pipe to the casing;

(f) a magnetizable nosecone secured on the inlet end of the plurality of interior magnets substantially opposite the inlet support ring;

(g) a magnetizable outlet cap secured on the outlet end of the plurality of interior magnets substantially opposite the outlet support ring; and (h) means for securing the nosecone, the outlet cap and the plurality of interior magnets with respect to the pipe.

14. A fluid treatment apparatus according to claim 13 further comprising a center tube within the pipe wherein the plurality of interior magnets is positioned within the center tube, and the nosecone and outlet cap cover the ends of the center tube, and the annular space is formed between the center tube and the pipe.

* * * * *